United States Patent [19]
Langley et al.

[11] 3,775,149

[45] Nov. 27, 1973

[54] PREPARATION OF PIGMENTS

[75] Inventors: Robert Langley, Newton Mearns; William Gill Warwick, Bridge of Weir, both of Scotland

[73] Assignee: Ciba-Geigy AG, Basel, Switzerland

[22] Filed: Nov. 18, 1971

[21] Appl. No.: 200,073

[30] Foreign Application Priority Data
Nov. 20, 1970   Great Britain................... 56,899/70

[52] U.S. Cl. ......................... 106/308 Q, 106/288 Q
[51] Int. Cl. .............................................. C08j 1/48
[58] Field of Search................... 106/308 Q, 288 Q, 106/309; 260/314.5

[56] References Cited
UNITED STATES PATENTS

| | | | |
|---|---|---|---|
| 3,127,412 | 3/1964 | Gaertner et al................. | 106/288 Q |
| 2,816,115 | 12/1957 | Howell............................ | 106/288 Q |
| 3,593,927 | 7/1971 | Neill .............................. | 106/308 Q |

FOREIGN PATENTS OR APPLICATIONS 1,096,192   2/1965   Great Britain.................. 106/288 Q

*Primary Examiner*—Delbert E. Gantz
*Assistant Examiner*—James W. Hellwege
*Attorney*—E. F. Wenderoth et al.

[57] ABSTRACT

A process in which phthalocyanine pigment is produced at least 80 percent in the $\beta$-pigmentary form by grinding a dispersed suspension of crude pigment in aqueous medium, preferably with particulate grinding elements which are insoluble in the aqueous medium, containing from 5 to 10 percent of surface active agent until the pigment flocculates and the system is converted into a filterable paste and by recovering the pigmentary phthalocyanine from the paste by filtration, the filterable paste of the phthalocyanine pigment and the phthalocyanine pigment prepared by the process.

8 Claims, No Drawings

PREPARATION OF PIGMENTS

This invention relates to the preparation of phthalocyanine pigments and is specifically concerned with the milling of crude phthalocyanine in aqueous suspension, in the presence of surface active agent, to give a filterable paste of phthalocyanine which is predominantly in the betapigmentary form.

In the physical form in which they are obtained by most methods of synthesis, phthalocyanines are hard crystalline solids which are not of value as pigments. Before they can be used as pigments, the crude phthalocyanines must be reduced to fine particle size and converted into suitable pigmentary form. Phthalocyanines exist in a number of crystalline forms, the two most important of which are known as alpha- and beta-forms, the former being in general somewhat redder in shade than the latter; in certain circumstances the beta-form is in fact the stable form and, especially in the presence of aromatic hydrocarbons, the alpha-form may convert into the beta-form. For these and other reasons, for pigmentation it is often preferred to use beta-form phthalocyanines ab initio.

Most methods of synthesis of unchlorinated phthalocyanines result in the formation of the crude beta-form, and it frequently occurs that the process by which the crude material is then converted into pigmentary form also converts a substantial proportion of the pigment into the alpha-form. Care must therefore be taken in the selection of a process which will effect the conversion to pigmentary form while at the same time retaining the beta-form of the pigment.

There is a considerable amount of prior art relating to the preparation of phthalocyanines in pigmentary form. As far as milling of the phthalocyanine is concerned, great stress has been laid on the necessity for the use of organic liquid as the medium in which the phthalocyanine is suspended; in U. S. Pat. Nos. 2,556,726 and 2,556,727, the use of large quantities of oxygenated organic liquids such as acetone or ethyl alcohol is advocated, and it is emphasised that replacement of the oxygenated organic liquid by water leads to failure and that wet grinding of phthalocyanine with ceramic or metallic balls has not resulted in a product with good pigmentary properties. Furthermore, British Pat. No. 1,091,906 also states that milling of crude phthalocyanine with grinding elements such as gravel, balls or sand in water does not give a product in suitable form for use as pigment.

Despite these statements, it would clearly be very advantageous if grinding or milling could be carried out in aqueous medium, thus obviating the need for solvents, and eliminating fire hazards. U. S. Pat. No. 2,816,115 does in fact describe such a process, where water is the medium, and indicates that beta pigmentary form phthalocyanine is produced. This process uses a water-soluble anionic dispersing agent in the milling, and the milling process results in an unfilterable slurry which then has to be flocculated and the pigment filtered off or used as the paste thus obtained. Presumably in an attempt to exclude this flocculation and filtration step, U. S. Pat. No. 2,999,862 describes a similar process, but specifies that water be the sole grinding medium.

The technology of aqueous suspensions containing surface active agents is complex and the stability of the dispersion is dependent on several factors. The surface active agent promotes stability by adsorbing to the solid/solution interface and the degree of stability achieved depends on the type and amount of surface active agent used. Obviously the greater the interfacial area then the more of a given surface active agent is required. The interfacial area depends on the weight of solid dispersed and on the mean particle size. In a system where the weight of solid dispersed is constant, but the mean particle size is being reduced by grinding, then the interfacial area is increasing and more and more surface active agent is required to maintain stability. If sufficient surface active agent is added initially so that at the end of grinding the required level of adsorption is attained then the dispersion will not flocculate and will be unfilterable. U. S. Pat. No. 2,816,115 clearly describes a process in which this condition is observed.

British Pat. No. 1,096,192 describes and claims a process for converting a crude copper phthalocyanine as there defined into an essentially alpha-form copper phthalocyanine, said process comprising milling by agitation with particulate grinding elements a slurry of the crude copper phthalocyanine in an aqueous medium which contains a surface active agent in amount not more than 5 percent of the weight of copper phthalocyanine, said agitation being continued until at least 90 percent of the copper phthalocyanine is in the alpha-crystal form. Later this specification says that more than 5 percent of surface active agent will maintain a substantial degree of deflocculation during the milling. Here clearly the amount of surface active agent used is insufficient to give dispersion stability throughout the milling process.

If, however, the amount of surface active agent added is insufficient to attain the required level of adsorption at the end of the grinding process then the dispersion will be flocculated and can be filtered without further treatment. Thus careful control of the amount of surface active agent can produce a technically valuable pigment which at the end of grinding is flocculated and filterable.

According to the present invention, therefore phthalocyanine pigment is produced at least 80 percent in the beta pigmentary form by (1) grinding a dispersed suspension of crude pigment in aqueous medium containing from 5 to 10 percent of weight of surface-active agent until the pigment flocculates and the system is converted into a filterable paste and (2) recovering the pigmentary phthalocyanine from the paste by filtration, centrifuging or spray drying. Preferably the grinding will be continued for a substantial time after apparent flocculation has occurred to ensure that the flocculation is as complete as possible.

Pigment produced according to the invention is easily isolated in dry form and has reasonable texture, whereas isolation of dry pigment from an unfilterable dispersion, for example by evaporation, usually leads to a very hard textured unacceptable product which may have a high content of surface-active agent. Both the filterable paste produced according to the invention and the pigment itself are thus valuable products.

We have examined the pigment suspensions microscopically at various stages during the process according to the invention. At the beginning of the process, large crude particles can be seen which quickly reduce in size during grinding. In the initial stages the particles are clearly separate from one another and the system is therefore deflocculated. On further size reduction the particles begin to flocculate together and again this is observed microscopically. At the end of the grinding period the extent of flocculation varies depending upon the type and amount of surface active agent used but in every case it has been possible to isolate the pigment by vacuum filtration through filter paper.

The process according to the invention results in the technically valuable beta-form pigment and requires less steps than the process of U. S. Pat. No. 2,816,115. At the same time, as will be shown later, the pigment product obtained is predominantly in the beat-form, unlike that obtained by the process of U. S. Pat. No. 2,999,862 in the absence of surface active agent which contains a substantial proportion of alpha-form.

The relative proportions of alpha- and beta-form in a pigment can be readily ascertained, for example from X-ray diffraction patterns, and by predominantly in the beta-form of at least 80 percent. We aim, of course, for 100 percent beta-form, but 95 percent and over is very acceptable.

The surface active agent used in the process may be non-ionic, cationic or anionic, but will preferably be water-soluble or such that it may be rendered water-soluble. The amount to be used will of course be determined functionally, such an amount that the system is flocculated during the course of the grinding, and this can readily be determined experimentally; a minimum quantity of 5 percent is stipulated because at levels less than this the pigment flocculates too rapidly and the product has not been able to benefit from the milling, may contain unnecessarily large amounts of alpha-form and is too weak in pigmentary properties. To demonstrate this, samples of crude copper phthalocyanine were ground for 100 hours with 10 times their weight of glass balls of diameter 1 mm. and with different amounts of the surface active agent sold under the trademark Texofor 90 A 20, a non-ionic material having the formula $R.O\ (C_2H_4O)_nH$ where $R$ is the radical from a $C_9$ fatty alcohol and $n$ is 20. The following results were obtained:

| Proportion of Texofor 90 A 20, percent | Proportion of betaform phthalocyanine in the product, percent | State of pigment at end of grinding |
| --- | --- | --- |
| 2½ | 94 | Flocculated. |
| 5 | 100 | Do. |
| 7½ | 100 | Do. |
| 10 | 100 | Do. |
| 12½ | 100 | De-flocculated. |
| 15 | 100 | Do. |

Clearly the necessary proportion of surface-active agent in this case lies between 5 and 10 percent. In general terms, we can expect to have to use between about 6 and 10 percent by weight calculated on the crude pigment of the surface active agent. A wide range of surface active agents may be used in the process according to the invention; examples of non-ionics are fatty acid condensates of ethylene oxide, alkyl phenol condensates of ethylene oxide and polyalkylene glycols, examples of cationic surface-active agents are fatty amines condensed with ethylene oxide, long chain primary amines and cetyl pyridinium bromide, and examples of anionic surface active agents are triethanolamine soaps, dodecyl benzene sulphonic acid and sulphated fatty alcohols.

The process according to the invention will preferably be carried out by grinding the pigment with particulate grinding elements which are insoluble in the aqueous medium. Sand, or porcelain, plastic, metal or glass balls may be used, glass balls of from 0.5 to 3 mm. diameter being very suitable. The grinding may be carried out in a ball-mill or a bead mill such as a Perl Mill (Perl is a trademark); in a batch grinding process, there will normally be used from about two to 14 parts by weight of grinding elements for each part of crude pigment.

The amount of water used in the process according to the invention should be sufficient to give a stirrable mass, and this is dependent upon the initial and final particle size of the pigment and the type of grinding apparatus used. The amount of water used may conveniently range from 0.5 to 50 parts by weight per part by weight of pigment and will generally be from 2 to 10 parts by weight per part by weight of pigment. The water may be added all at once, but if desired, it may be added over a period of time so that at the beginning of the grinding period the pigment is in a higher concentration than at the end. Where the water is added over a period of time, the grinding mixture may initially contain an amount of water in the range of from 0.5 to 1 part by weight based on the weight of pigment, further water being added slowly until the mixture contains between 5 and 15 parts by weight of water per part by weight of pigment.

The time of grinding will depend on the grinding apparatus used, the weight, size and type of grinding aid and the amount of water. Where a Perl Mill is used, the time of grinding will normally be at least 2 hours and will generally be at least 6 hours. Where a ball-mill is used, the time of grinding will mostly be between 24 and 200 hours. However, whatever the type of apparatus, the total time of grinding is advantageously between 1½ and 2 times the time taken to initially flocculate the pigment.

The process according to the invention will work perfectly adequately at room temperature, say 20° C. In fact, all grinding operations result in generation of heat, so that cooling is necessary if the mix is to be kept at ambient temperature; the temperature may be allowed to rise somewhat, for example to 60° C., so as to save expense on cooling, without detrimental effect, but we prefer that the temperature of grinding should not in any case rise to above 90° C.

After the grinding is completed, the pigment will generally be filtered off from the aqueous mix, washed and dried. Pigment can thus be readily obtained in the dry beta-pigmentary form, another advantage of the invention. If desired the pigment may be subjected to conventional treatment after it has been comminuted, for example treatment with hydrochloric acid at elevated temperature, followed by filtering, washing free from chloride and drying.

The pigments prepared in accordance with the present invention have a high tinctorial strength and may be used for colouring a variety of products, for instance, paper, plastics, lacquers, inks and artificial fibres. The invention is applicable to all types of phthalocyanine pigments, metal-free or metal-containing such as cobalt-, zinc-, cadmium- and nickel phthalocyanines. Specifically, however, copper phthalocyanine is of interest, since this product has the greatest commercial importance.

Some Examples will now be given, all parts and proportions being by weight unless otherwise stated.

EXAMPLES 1 – 24

20 parts of crude copper phthalocyanine blue. 2 parts of surface active agent and 200 parts of water were ball-milled for 100 hours at 20° C. with 200 parts of glass grinding balls of diameter 1 mm. After this grinding, the pigment which had flocculated was filtered off, washed and dried, and then analysed. The following results were obtained:

| Example | Surface active agent | Proportion of beta-form phthalocyanine in product, percent |
|---|---|---|
| 1 | None | 55 |
| 2 | Texofor A2: Ethoxylated (2 mol) cetyl oleyl alcohol. | 100 |
| 3 | Texofor A6: Ethoxylated (6 mol) cetyl oleyl alcohol. | 100 |
| 4 | Texofor A10: Ethoxylated (10 mol) cetyl oleyl alcohol. | 94 |
| 5 | Texofor B9: Ethoxylated (9 mol) lauryl alcohol. | 96 |
| 6 | Texofor CD: Polyalkylene glycol 300 dolleate | 100 |
| 7 | Texofor FX128: Ethoxylated (12/13 mol) octyl cresol. | 100 |
| 8 | Texofor 90A4: Ethoxylated (4 mol) oleyl cetyl alcohol. | 100 |
| 9 | Supronic B75: Polyalkylene glycols—Block polymer of ethylene and propylene oxides. | 93 |
| 10 | Supronic B100: Polyalkylene glycols—Block polymer of ethylene and propylene oxides. | 100 |
| 11 | Emulsogen M: Alkyl phenol condensate of ethylene oxide. | 100 |
| 12 | Lissapol NX: Nonyl phenol condensate of ethylene oxide. | 97 |
| 13 | Belloid F2: Triethanolamine soap of rosin/oleic acid/linseed oil. | 100 |
| 14 | Belloid FR: Triethanolamine oleate. | 99 |
| 15 | Nansa SSA: Dodecyl benzene sulphonic acid. | 100 |
| 16 | Pentrone T: Sodium salt of sulphated oleyl cetyl alcohol. | 91 |
| 17 | Catafor 02 (oleylamine condensed with 2 mols ethylene oxide) as acetate. | 98 |
| 18 | Catafor 05 (oleylamine condensed with 5 mols ethylene oxide) as acetate. | 100 |
| 19 | Catafor 06 (oleylamine condensed with 6 mols ethylene oxide) as acetate. | 100 |
| 20 | Catafor 09 (oleylamine condensed with 9 mols ethylene oxide) as acetate. | 94 |
| 21 | Armeen CD (long chain primary amine (mainly $C_{12}$)) as acetate. | 98 |
| 22 | Armeen T (long chain primary amine ($C_{16}$, $C_{18}$ and oleyl)) as acetate. | 100 |
| 23 | Ethomeen S/12: Ethoxylated (2 mol.) soya fatty amines. | 100 |
| 24 | Morpan CPB: Cetyl pyridinium bromide. | 100 | texofor, Supronic, Emulsogen, Belloid, Nansa, Pentrone, Catafor, Armeen, Ethomeen and Morpan are trade marks.

EXAMPLE 25

25 parts of crude copper phthalocyanine Blue, one part of Texofor 90 A 20 and 1.2 parts of Nansa SSA in 35 parts of water were passed a number of times through a 50 litre Perl Mill at 60° C. in the presence of 200 parts of glass grinding balls having a diameter of approximately 1 millimetre. Water was added slowly until 200 parts had been added. The total grinding time was 12 hours.

10 parts of dilute hydrochloric acid were added and the mixture stirred for 1 hour at 80° C. The pigment was filtered off, washed chloride free and dried at 60° C.

A phthalocyanine blue pigment 100% in the beta-form was produced which was of excellent strength in lithographic inks.

EXAMPLE 26

60 gm. of crude copper phthalocyanine blue presscake (containing 40 gm. dry weight) were diluted with 30 ml. of water and 3 gm. Texofor 90 A 20 added.

The suspension was ground on a 1 litre Perl Mill charged with 1 mm. glass beads for 24 hours during which time 350 ml. of water were added in portions to maintain fluidity. After grinding, the glass beads were sieved out and the suspension was stirred with 60 gm. concentrated hydrochloric acid for 1 hour at 80° C; the pigment was then filtered off, washed and dried at 60° C.

The product contained 90 percent beta-form and 10 percent alpha-form.

EXAMPLE 27

30 gm. of crude copper phthalocyanine blue presscake (containing 20 gm. dry weight) were diluted with 50 ml. water and 1.5 gm. Nansa SSA added.

The suspension was ground on a 1 litre Perl Mill charged with 1 mm. glass beads for 24 hours during which time 200 ml. water were added in portions to maintain fluidity. After grinding, the glass beads were sieved out and the suspension was stirred with 30 gm. concentrated hydrochloric acid for 1 hour at 80° C; the pigment was then filtered off, washed and dried at 60° C. The product contained 82 percent beta-form and 18 percent alpha-form.

EXAMPLE 28

60 gm. crude copper phthalocyanine blue presscake (containing 40 gm. dry weight) were diluted with 30 ml. of water containing 3.0 gm. Catafor 02 and 1.5 ml. glacial acetic acid.

The suspension was ground on a 1 litre Perl Mill charged with 1 mm. glass beads for 24 hours during which time 350 ml. water were added in portions to maintain fluidity. The glass beads were sieved out and the suspension stirred with 60 gm. concentrated hydrochloric acid for 1 hour at 80° C; the pigment was then filtered off, washed and dried at 60° C.

The product contained 88 percent beta-form and 12 percent alpha-form.

EXAMPLE 29

The process described in Example 2 of U. S. Pat. No. 2,999,862 was carried out, namely the grinding of 17 parts of crude copper phthalocyanine and 200 parts of water in a ball mill for 40 hours at 65° C. The process was then repeated twice, adding 6 percent of Texafor 90 A 20 and 6 percent of Catafor 02 respectively to the mixture to be ground. The product prepared according to the U.S. patent contained 30 percent alpha-form; the products prepared according to the invention contained less than 1 percent alpha-form and were greener shade pigments than the other.

What we claim is:

1. A process for preparing phthalocyanine pigment wherein at least 80 percent of the pigment is in the β pigmentary form, which comprises grinding a dispersed suspension of crude phthalocyanine pigment in an aqueous medium containing from 5 to 10 percent by weight of surface active agent, based on the weight of the crude pigment, until the pigment flocculates and the system is converted into a filterable paste, and recovering the pigmentary phthalocyanine from the paste by filtration, centrifuging or spray drying.

2. A process according to claim 1 in which the crude pigment is ground with particulate grinding elements which are insoluble in the aqueous medium.

3. A process according to claim 2 in which the phthalocyanine produced is at least 95 percent in the $\beta$ pigmentary form.

4. A process according to claim 2 in which the total time of grinding is between 1½ and 2 times the time taken to initially flocculate the pigment.

5. A process according to claim 2 in which there is used 5–8.8 percent surface active agent.

6. A process according to claim 5 in which the surface active agent used is or may be rendered water-soluble.

7. A process according to claim 2 in which the pigment is filtered from the paste, washed and dried.

8. A process according to claim 2 in which the filterable paste is treated with hydrochloric acid at elevated temperature, and the pigment then filtered from the paste, washed and dried.

* * * * *